United States Patent Office 3,324,099
Patented June 6, 1967

3,324,099
POLYMERIZATION USING A CATALYST COMPRISING AN ALKYLLITHIUM AND A BENZYL MERCAPTAN
William J. Trepka, Bartlesville, Okla., assignor to Phillips Petroleum Company, a corporation of Delaware
No Drawing. Filed Mar. 24, 1965, Ser. No. 442,483
13 Claims. (Cl. 260—94.4)

ABSTRACT OF THE DISCLOSURE

Polymerization initiators for use in polymerizing conjugated dienes and other vinylidene-containing monomers are prepared by reaction of an alkyllithium compound with a derivative of benzyl mercaptan. In addition, polymerization system utilizing these initiators can be modified with organotin compounds of the formula $SnR''_4$ wherein $R''$ is an allylic-type group having 3 to 12 carbon atoms or an aromatic radical having 6 to 12 carbon atoms and at least one of the $R''$ groups being the allylic-type group.

---

This invention relates to an improved organolithium polymerization initiator and to the method for making same. In another aspect it relates to the polymerization of vinylidene-containing monomers with a novel organolithium initiator.

Monomers containing vinylidene groups such as conjugated dienes and vinyl-substituted aromatic compounds are readily polymerized with organolithium compounds such as butyllithium. Polymers which are terminally reactive can be formed by using such an initiator and terminating the polymerization with a reagent or reagents so that the lithium atoms present in the polymer are replaced with stable reactive groups. The polymerization reactions proceed to completion in many instances with substantially quantitative production of polymer from the monomers charged, and the molecular weight of the polymer can be regulated to some extent by varying the amount of iniator used. Increasing the concentration of initiator in relation to the monomer charged reduces the molecular weight of the product. In this manner liquid, semisolid and solid polymers can be prepared.

In following a procedure as above described, controlling the molecular weight is difficult when preparing rubbery polymers or solid resins of high molecular weight. Very small amounts of initiator of the type described are required to produce solid polymers so that accurate regulation of initiator level is difficult. It is desirable, therefore, to find methods of increasing the inherent viscosity of polymers while operating at controllable initiator levels.

I have discovered that a polymerization initiator which is valuable for polymerizing conjugated dienes and other vinylidene-containing monomers can be prepared by reacting an alkyllithium compound with a dimercapto compound selected from the group consisting of bis(mercaptomethylphenyl) ethers, bis(mercaptomethylphenyl) thioethers, bis(mercaptomethylphenyl) methanes, bis(mercaptomethylphenyl) amines, and bis(mercaptomethylphenyl) silanes. The reaction product formed by contacting these materials has limited solubility in hydrocarbon solvents and thereby permits more accurate regulation of the inherent viscosity of the polymer formed in a hydrocarbon medium.

It is an object of my invention to provide an improved method for polymerizing vinylidene-containing monomers. Another object is to provide a method for preparing an organolithium initiator which is sparingly soluble in hydrocarbon solvent. Another object is to provide a polymerization initiator which can be used to polymerize conjugated dienes, such as isoprene or butadiene, in a hydrocarbon solvent to form solid, rubbery polymers having higher inherent viscosity than would be obtained using the same initiator level of an alkyllithium compound. Other objects, advantages and features of my invention will be apparent to those skilled in the art from the following discussion.

It has now been found that lithium alkyls can be reacted with certain derivatives of benzyl mercaptan, free from halogen substituents on the aromatic ring, to produce complex compounds which are active initiators for the polymerization of vinylidene-containing monomers. The benzyl mercaptan derivatives from which the initiators are prepared can be represented by the formula

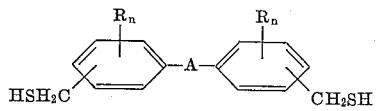

wherein A is a bivalent radical selected from the group consisting of —O—, —S—,

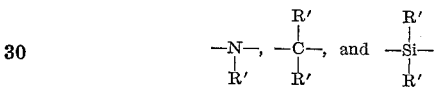

R and R' are hydrocarbon substituents selected from the group consisting of alkyl and cycloalkyl radicals with the total number of carbon atoms in the R hydrocarbon substituents not exceeding 12, the total number of carbon atoms in the R' hydrocarbon substituents not exeeding 12, and $n$ is an integer from 0 to 4.

Illustrative of compounds that correspond to the foregoing formula are the following:

4,4'-oxybisbenzyl mercaptan or
bis(4-mercaptomethylphenyl) ether,
4,4'-thiobisbenzyl mercaptan or
bis(4-mercaptomethylphenyl) thioether,
bis(2-mercaptomethylphenyl) ether,
bis(2,6-dimethyl-4-mercaptomethylphenyl) ether,
diethyl-bis(4-mercaptomethylphenyl)methane,
methyl-n-propyl-bis(3-mercaptomethylphenyl)-
  methane,
n-dodecyl-bis(4-mercaptomethylphenyl)amine,
tert-butyl-bis(2,6-di-n-propyl-4-mercaptomethyl-
  phenyl)amine,
di-n-hexyl-bis(4-mercaptomethylphenyl)silane,
bis(2,3,5,6-tetramethyl-4-mercaptomethpylphenyl)
  ether,
4-mercaptomethylphenyl,
3,5-dimethyl-2-mercaptomethylphenyl ether,
cyclopentyl-bis(3-isopropyl-5-mercaptomethyl)amine,
and methyl(cyclohexyl)-bis(3-n-amyl-4-mercapto-
  methylphenyl)silane.

The initiators of this invention are conveniently prepared by reacting a benzyl mercaptan derivative as hereinbefore described with a lithium alkyl preferably containing from 3 to 8 carbon atoms per molecule, e.g. n-propyllithium, isopropyllithium, n-butyllithium, sec-butyllithium, tert-butyllithium, tert-amyllithium, n-hexyllithium and n-octyllithium, in the presence of a hydrocarbon diluent. The reaction is preferably carried out at a temperature in the range of 50 to 150° F. while the mixture is agitated. The products have only limited solubility in hydrocarbons and generally precipitate as soon as formed. The solid product is separated by centrifugation, filtration or other means to remove unreacted materials and side products, and redispersed in hydrocarbon.

When preparing the initiators, an excess of the lithium alkyl is used, the amount being sufficient to react with the mercapto groups and to provide at least two mols to form the complex compound. The amount of lithium alkyl is in the range of from 4 to 15 mols per mol of the benzyl mercaptan derivative.

Suitable hydrocarbon diluents include benzene, toluene, cyclohexane, methylcyclohexane, xylene, n-butane, n-hexane, n-heptane, isooctane, n-decane, and similar paraffins, cycloparaffins and aromatics, ordinarily containing about 4 to 10 carbon atoms per molecule. The time required for the preparation of the initiator can vary from a few minutes to several hours, depending upon the conditions and the reactants.

The vinylidene-containing monomers which can be polymerized by the initiators described herein are the conjugated dienes containing 4 to 12 carbon atoms per molecule. Examples of such conjugated dienes include 1,3-butadiene, isoprene, 2,3-dimethyl-1,3-butadiene, piperylene, 3-butyl-1,3-octadiene, 2-phenyl-1,3-butadiene and the like. Conjugated dienes containing halogen and alkoxy substituents such as chloroprene and 2-methoxy-1,3-butadiene can also be used. The conjugated dienes can be formed into homopolymers or copolymers including block copolymers prepared by charging the monomers sequentially.

Also included among the vinylidene-containing monomers are the vinyl-substituted aromatic compounds such as styrene, 1-vinylnaphthalene, 2-vinylnaphthalene and the alkyl, cycloalkyl, aryl, alkaryl, aralkyl, alkoxy, aryloxy, and dialkylamino derivatives thereof in which the total number of carbon atoms in the combined substituents does not exceed 12. Examples include 3-methylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolylstyrene, 4-phenylstyrene, 4,5-dimethyl-1-vinylnaphthalene, 3-n-propyl-2-vinylnaphthalene, and the like. These vinyl-substituted aromatic compounds can be used to form homopolymers or copolymers including block copolymers with each other or with conjugated dienes.

In addition, certain polar monomers can be polymerized to form homopolymers or copolymers with each other or copolymerized with conjugated dienes and/or vinyl-substituted aromatic compounds. Block copolymers of these monomers can be prepared by introducing the polar monomer after the non-polar monomer has polymerized. These include the vinylpyridines and the vinylquinolines in which the vinyl group is attached to a ring carbon other than a carbon in the beta position with respect to the nitrogen. Examples are the pyridine, quinoline or isoquinoline derivatives corresponding to those described in connection with the vinyl-substiuted aromatic compounds. Examples include 2-vinylpyridine, 5-cyclohexyl-2-vinylpyridine, 6-methoxy-2-vinylpyridine, 3-benzyl-4-vinylpyridine, 4-phenyl-2-vinylpyridine, 4-dimethylamino-2-vinylquinoline, 3-vinylisoquinoline, and the like. Other polar monomers include methyl acrylate, ethyl acrylate, methyl methacrylate, butyl methacrylate, acrylonitrile, methacrylonitrile, N,N-dimethylacrylamide, and similar acrylic and alkacrylic acid esters, nitriles, and N,N-disubstituted amides. Vinylfuran and N-vinylcarbazole can also be used.

The polymerizations are carried out in predominantly hydrocarbon liquid diluents at temperatures in the range of about −100 to +150° C., preferably between −75 and +75° C. The most desirable temperature depends upon the monomers and the initiator used in the polymerization. The amount of initiator charged can vary considerably because of its limited solubility but ordinarily the amount used is in the range of about 0.5 to 200, preferably 1 to 150 milliequivalents per 100 grams of monomers. The milliequivalents of initiator used in the polymerizations is based upon the total lithium present in the initiator composition as determined by titration or by calculation from the molarity, knowing the number of lithium atoms in each molecule of initiator.

The initiator can be titrated by hydrolyzing a sample of the product with water and then titrating the lithium wih HCl. The polymerization diluent is suitably a hydrocarbon of the same type previously described for preparation of the initiator.

The polymerization mixture should be agitated and the reaction time can extend from a few minutes to 100 hours or more. At the end of the reaction the initiator can be inactivated and the polymer coagulated by adding an acid or alcohol. The polymer is then separated, washed and dried using conventional recovery techniques.

One of the important aspects of this invention is that the advantages of limited initiator solubility can be enjoyed in producing polymers without functionality. The mercapto group of the initiator composition is not incorporated into the polymer. Since these complex initiator compositions are sparingly soluble in hydrocarbon diluents, the initiator level for a polymerization reaction can be readily controlled to prepare polymers of any desired molecular weight.

In order to introduce functional groups in the polymer in place of the lithium atoms, it is necessary to treat the polymer solution before inactivating the initiator with water, alcohol or acid. The polymer solution can be treated with carbon dioxide to introduce carboxy groups, with a cyclic disulfide or sulfur to introduce mercapto groups, with aldehydes, ketones or epoxy compounds such as acetaldehyde, acetone or ethylene oxide to introduce hydroxy groups, with carbon disulfide to introduce carbodithio groups, and the like. It is ordinarily necessary to remove the lithium atoms from the salt which forms in the termination reaction by hydrolysis using alcohol, acid or water.

The polymer can be coupled while it still contains an active terminal lithium atom by selection of the type and amount of terminating agents used. For example, carbon dioxide, depending upon the amount used, can either couple the polymer or terminate it with carboxy groups. Also the polymer containing terminal reactive groups can be coupled by reaction with a polyfunctional compound. For example, a diisocyanate can be used to couple a polymer containing terminal hydroxy groups or a polyaziridinyl compound to couple a carboxy-terminated polymer.

In addition, polymerization systems in which the initiators of this invention are employed can be modified with organotin compounds of the formula $SnR''_4$ wherein each $R''$ is an allylic-type group having 3 to 12 carbon atoms or an aromatic radical having 6 to 12 carbon atoms, at least one of the $R''$ groups being the allylic-type group.

The tin modifiers have at least one allylic-type organic radical bonded to the tin atom. By "allylic-type" radical is meant an unsaturated organic radical in which the double bond is one carbon atom removed from the tin, as represented by the formula:

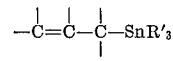

in which the unsatisfied valences shown are bonds to hydrogen or hydrocarbon radicals or the carbons of the double bond can be joined in a ring structure as in benzyl or 2-thienylmethyl. Preferred radicals of this type are alkenyl and benzyl radicals having 3 to 12 carbon atoms. The $R'$ groups in the above formula are as previously defined and can be of the allylic-type or aromatic radicals in which the tin is bonded to a ring-carbon, such as phenyl, 1-naphthyl, 2-naphthyl, 2-biphenylyl, 3-biphenylyl, or 4-biphenylyl, or alkyl-substituted derivatives thereof having up to 12 carbon atoms.

The tin modifiers are preferably allyl- or benzyltin compounds which can contain up to 3 phenyl groups. Examples of such compounds which come within the scope of the general formula given above include:

tetraallyltin,
diallyldiphenyltin,
allyltriphenyltin,
tribenzylphenyltin,
dibenzyldiphenyltin,
tetra-2-butenyltin,
tri-1-methallyl-4-tolyltin,
di-2-hexenyldi-(3,5-di-n-propylphenyl)-tin,
2-dodecenyl-tri-1-naphthyltin,
di-6-phenyl-2-hexenyldi-4-ethyl-2-naphthyltin,
tri-4-methyl-2-hexenyl-2-biphenylyltin,
tetra-4-cyclohexyl-2-butenyltin,
3-benzyl-2-propenyltri-3-biphenylyltin,
tri-5(4-tolyl)-2-pentenyl-4-biphenylyltin,
tri-2-methylbenzyl-4(4'-methylbiphenylyl)tin,
di-3,5-diethylbenzylyl-3-tolytin,
tetra-4-n-amylbenzyltin,
tri-4-tert-butylbenzyl-2-naphthyltin,
di-2,4,6-trimethylbenzyldiphenyltin,
tri-2-thienylmethylphenyltin,
tetra[3,4-dimethyl-(2-thienylmethyl)]tin,
tri[4-n-propyl-(2-thienylmethyl)]phenyltin,
di[4,5-diethyl-(2-thienylmethyl)]diphenyltin,
and the like.

In order to benefit from the modification of the tin compound, the initiator concentration should be held at a low level, ordinarily not over 3 milliequivalents per 100 parts by weight of monomer. In commercial operations where significant amounts of initiator poisons may be present in the feedstocks, somewhat higher amounts of initiator can be permitted. It is frequently necessary to increase the amount of initiator charged in commercial operations in order to overcome the disadvantage of the presence of initiator poisons and achieve satisfactory polymerization rates and conversions.

The amount of tin modifier used should be at least 0.05 milliequivalent of allylic-type group per 100 parts by weight of monomer and ordinarily does not exceed 10 milliequivalents on the same basis. The range of modifier level is preferably in the range of about 0.2 to 5 milliequivalents per 100 weight parts of monomer. This ratio is subject to variance depending upon the initiator, the amount of initiator, and the particular tin modifier used. The equivalent weight of the modifier depends upon the number of allylic-type groups attached to the tin atom. For example, one mol of tetraallyltin is 4 equivalents and one mol of tribenzylphenyltin is 3 equivalents. The modifier can be added to the polymerization mixture after charging the diluent, monomer and initiator or the initiator and modifier can be premixed prior to charging to the polymerization reactor. As the amount of modifier is increased, the inherent viscosity of the polymer is decreased with initiator level remaining constant. Also, increasing the level of modifier tends to increase the cis content of the polybutadiene formed. The cis content can also be increased without greatly changing the inherent viscosity by maintaining the level of modifier constant and reducing the amount of initiator used. The process of this invention, therefore, provides considerable flexibility and choice of polymer properties.

The following examples are presented further to illustrate the invention. It is not intended, however, that the invention be unduly limited to the embodiments described therein.

*Example I*

The following recipe was employed for the reaction of n-butyllithium with 4,4'-oxybisbenzyl mercaptan:

| | |
|---|---|
| 4,4'-oxybisbenzyl mercaptan, grams | 6.6 |
| Toluene, ml | 100 |
| n-Butyllithium, mol | 0.15 |
| Time, hours | 24 |
| Temperature, °F. | 86 |

Toluene was charged first after which the reactor was purged with nitrogen. The 4,4'-oxybisbenzyl mercaptan was then dissolved in the toluene, butyllithium was added, and the mixture was agitated for 24 hours while the temperature was maintained at 86° F. An orange precipitate was formed. It was separated by centrifuging the mixture and the supernatant liquid was discarded. Toluene was added, the mixture was agitated and the solid product was washed with pentane. It was then dispersed in pentane and a 5 milliliter sample taken for analysis by gas liquid chromatography (GLC). The remaining product was again washed with pentane, dispersed in pentane, and a sample again withdrawn for analysis. A third sample was obtained by repeating the washing procedure and dispersing the product in pentane. Another portion of the pentane suspension was sampled (3 ml.), the sample hydrolyzed, and the hydrolysate titrated with 0.1 N HCl. Following are the data for the titration and the GLC analysis.

Titration:

| | |
|---|---|
| Aliquot hydrolyzed, ml. | 3 |
| 0.1 N HCl required, ml. | 12.2 |
| Normality of suspension | 0.4 |

GLC analysis mmols butane/5 ml. sample of dispersion of product:

| | |
|---|---|
| Sample 1 | 0.836 |
| Sample 2 | 0.897 |
| Sample 3 | 0.793 |

The slight change in results from GLC analysis from sample 1 to sample 3 indicates that the 4,4'-oxybisbenzyl mercaptan-butyllithium reaction product was a tight complex that could not be separated readily by washing with pentane.

A 5 ml. sample of pentane suspension of the product represents 2.0 milliequivalents of alkalinity, i.e., (5)(0.4)=2.0 (based on total alkalinity).

$$\frac{0.793}{2}(100) = 39.7\%$$

(alkalinity represented by the butyllithium in the complex)

The foregoing data show that the solid reaction product of 4,4'-oxybisbenzyl mercaptan and butyllithium is a complex compound.

*Example II*

The 4,4'-oxybisbenzyl mercaptan-butyllithium complex described in Example I was employed as the initiator in a series of reactions for the polymerization of isoprene. The following recipe was used:

| | |
|---|---|
| Isoprene, parts by weight | 100 |
| Pentane, parts by weight | 1000 |
| Initiator, meq./hm.[1] | variable |
| Time, hours | 24 |
| Temperature, °F. | 122 |

[1] Milliequivalents/hundred grams monomer.

Pentane was charged first, the reactor was purged with nitrogen, isoprene was added, then the initiator. The reactants were agitated for 24 hours during which time the temperature was maintained at 122° F. Following this polymerization period, a solution of 2,2'-methylene-bis (4-methyl-6-tert-butylphenol) in isopropyl alcohol was added in an amount to provide one part by weight per 100 parts by weight rubber. The polymer was coagulated in isopropyl alcohol, separated, and dried. Results obtained in the several runs are presented in Table I:

TABLE I

| Run No. | Initiator, meq./hm. | Conv., percent | Microstructure, percent [1] | | Inherent Viscosity | Gel, percent |
|---|---|---|---|---|---|---|
| | | | cis | 3,4-addition | | |
| 1 | 2.0 | 100 | 78.1 | 6.0 | 8.52 | 0 |
| 2 | 3.0 | 100 | 73.5 | 6.9 | 4.89 | 0 |
| 3 | 3.5 | 100 | 70.4 | 7.0 | 4.15 | 0 |
| 4 | 4.0 | 100 | 70.4 | 6.9 | 3.63 | 0 |
| 5 | 4.5 | 100 | 67.4 | 7.1 | 3.19 | 0 |

[1] Raw values.

These data show that the oxybisbenzyl mercaptan-butyllithium complex was an efficient initiator for the polymerization of isoprene.

*Example III*

The recipe of Example II was employed for the polymerization of isoprene using an initiator level of 2.2 meq./hm. The rubber was evaluated in a tread stock recipe. The compounding recipe, raw polymer and processing properties, and properties of vulcanizates are presented in Table II:

TABLE II

Compounding recipe, parts by weight:
Polymer _____ 100
High abrasion furnace black _____ 50
Zinc oxide _____ 3
Stearic acid _____ 3
Flexamine [1] _____ 1
Flexzone 3C [2] _____ 2
Aromatic oil (Philrich 5) _____ 5
Pepton 22 [3] _____ 1
Sulfur _____ 2.25
NOBS Special [4] _____ 0.5

Raw polymer properties:
 Microstructure, percent: [5]
  cis _____ 76.6
  3,4-addition _____ 6.1
 Inherent viscosity _____ 8.40
 Gel, percent _____ 0
 ML-4 at 212° F.[a][6] _____ 57

Processing properties:
 290° F. mix, 6 minutes:
  Dump temperature, ° F. _____ 260
  Compounded ML-4 at 212° F. _____ 78
 Extrusion at 195° F.:
  Inches/min. _____ 48.5
  Grams/min. _____ 74
  Rating (Garvey die) _____ 7
 330° F. remix, 5 minutes:
  Dump temperature, ° F. _____ 300
  Compounded ML-4 at 212° F. _____ 45.5

Extrusion at 195° F.:
  Inches/min. _____ 54
  Grams/min. _____ 96
  Rating (Garvey die) _____ 10
 Compounded ML-4 at 212° F. _____ 38.2
Vulcanizate properties, cured 30 minutes at 292° F.:
 $\mu \times 10^4$, mols/cc. _____ 1.61
 300% modulus, p.s.i.[b] _____ 1300
 Tensile, p.s.i.[b] _____ 3270
 Elongation, percent [b] _____ 590
 $\Delta T$, ° F.[c] _____ 36.3
 Resilience, percent [d] _____ 76.2
 Shore A hardness [e] _____ 56

[1] Physical mixture containing 65 percent of a complex di-arylamineketone reaction product and 35 percent of N,N'-diphenyl-p-phenylenediamine.
[2] N-isopropyl-N'-phenyl-p-phenylenediamine.
[3] di-o-benzamidophenyl disulfide.
[4] N-oxydiethylene-2-benzothiazyl sulfenamide.
[5] Raw values.
[6] Final compounded ML-4 at 212° F. after curatives were added.
[a]–[e] As in Table IV.

The data show that considerable breakdown in the rubber occurred under the mixing conditions employed and that the vulcanizate had good properties.

*Example IV*

Four polybutadiene rubber samples were prepared for evaluation purposes. 4,4'-oxybisbenzyl mercaptan-butyllithium complex was employed as the polymerization initiator for the first two and, in addition, the system was modified with diallyldiphenyltin. Another sample was prepared using a diallyldiphenyltin-modified butyllithium system and a fourth was prepared in the presence of butyllithium without a modified (controls). Following was the charging procedure: solvent, nitrogen purge, butadiene, initiator, modifier (when used). Each of the first three samples consisted of a blend of polymers from five runs while the fourth was a single run. Polymer preparations and properties of each are summarized in Table III. The polymers were all protected with 1 phr of 2,2'-methylene-bis(4-methyl-6-tert-butylphenol).

TABLE III

| | Sample 1 | | | | | Sample 2 | | | | | Sample 3 | | | | | Sample 4 |
|---|---|---|---|---|---|---|---|---|---|---|---|---|---|---|---|---|
| 1,3-butadiene, parts by wt | 100 | 100 | 100 | 100 | 100 | 100 | 100 | 100 | 100 | 100 | 100 | 100 | 100 | 100 | 100 | 100 |
| Cyclohexane, parts by wt | 780 | 780 | 780 | 780 | 780 | 780 | 780 | 780 | 780 | 780 | 780 | 780 | 780 | 780 | 780 | 780 |
| Initiator, meq./hm.: | | | | | | | | | | | | | | | | |
| Complex | [1]2.3 | [1]2.3 | [1]2.3 | [2]2.4 | [2]2.4 | [2]2.2 | [2]2.2 | [2]2.2 | [2]2.4 | [2]2.4 | | | | | | |
| n-Butyllithium | | | | | | | | | | | 1.0 | 1.0 | 1.0 | 1.0 | 1.0 | 1.2 |
| Diallyldiphenyltin, mhm | 0.65 | 0.65 | 0.65 | 0.6 | 0.6 | 0.6 | 0.6 | 0.6 | 0.6 | 0.6 | 0.6 | 0.6 | 0.6 | 0.6 | 0.6 | |
| Time, hours | 24 | 24 | 24 | 24 | 24 | 24 | 24 | 24 | 24 | 24 | 24 | 24 | 24 | 24 | 24 | 3 |
| Temperature, °F | 122 | 122 | 122 | 122 | 122 | 122 | 122 | 122 | 122 | 122 | 122 | 122 | 122 | 122 | 122 | 122 |
| Conversion, percent | 96.2 | 100 | 100 | 100 | 99.5 | 98.1 | 98.8 | 92.8 | 98.4 | 93.2 | 98.4 | 98.6 | 100 | 100 | 100 | 100 |
| Microstructure, percent: | | | | | | | | | | | | | | | | |
| cis | 64.9 | 66.3 | 70.9 | 67.5 | 67.2 | 72.7 | 73.9 | 71.9 | 72.3 | 74.8 | 48.5 | 50.3 | 47.8 | 49.9 | 49.0 | 43.9 |
| trans | 30.2 | 27.0 | 24.7 | 27.8 | 27.9 | 23.1 | 22.1 | 24.1 | 23.5 | 21.2 | 45.3 | 43.2 | 45.7 | 43.7 | 44.9 | 49.4 |
| Vinyl | 4.9 | 4.7 | 4.4 | 4.7 | 4.9 | 4.2 | 4.0 | 4.0 | 4.2 | 4.0 | 6.2 | 6.5 | 6.5 | 6.4 | 6.1 | 6.7 |
| Inherent viscosity | 2.21 | 2.21 | 2.18 | 2.09 | 2.03 | 1.92 | 2.01 | 1.91 | 2.00 | 1.95 | 2.11 | 2.03 | 1.90 | 1.97 | 2.02 | 2.30 |
| Gel, percent | 0 | 0 | 0 | 0 | 0 | 0 | 0 | 0 | 0 | 0 | 0 | 0 | 0 | 0 | 0 | 0 |
| Grams Polymer | 33.0 | 34.6 | 34.4 | 37.0 | 36.4 | 35.6 | 36.3 | 30.3 | 35.6 | 32.7 | 34.6 | 33.0 | 35.0 | 32.9 | 34.9 | 200 |

[1] Polymerization did not initiate with 1.9 meq./hm. after one hour so 0.4 meq./hm. initiator was added as a booster. Initiator was the same as described in Example I.
[2] Initiator prepared by same recipe but N=0.51.

Blends of the several polymers were prepared to obtain samples 1, 2, and 3 for evaluation. All four samples were compounded in a tread stock recipe. The compounding recipe, raw polymer and processing properties, and properties of vulcanizates are presented in Table IV.

TABLE IV

|  | 1 | 2 | 3 | 4 |
|---|---|---|---|---|
| Coppounding recipe, Parts by Weight: |  |  |  |  |
| Polymer, parts by weight | 100 | 100 | 100 | 100 |
| High abrasion furnace black | 50 | 50 | 50 | 50 |
| Zinc oxide | 3 | 3 | 3 | 3 |
| Stearic acid | 1 | 1 | 1 | 1 |
| Flexamine [1] | 1 | 1 | 1 | 1 |
| Resin 731 D | 5 | 5 | 5 | 5 |
| Philrich 5 [1] | 5 | 5 | 5 | 5 |
| Sulfur | 1.75 | 1.75 | 1.75 | 1.75 |
| NOBS Special [1] | 1.2 | 1.2 | 1.2 | 1.2 |
| Raw Polymer Properties: |  |  |  |  |
| Microstructure, percent: |  |  |  |  |
| cis | 66.7 | 72.2 | 49.2 | 45.7 |
| trans | 28.5 | 23.5 | 44.4 | 47.7 |
| Vinyl | 4.8 | 4.3 | 6.4 | 6.6 |
| Inherent viscosity | 2.12 | 1.95 | 2.00 | 2.21 |
| Gel, percent | 0 | 0 | 0 | 0 |
| ML-4 at 212° F | 64 | 50.5 | 54. | 40 |
| Cold flow, mg./min | 0.0 | 0.9 | 0.5 | 18.0 |
| Processing Properties: |  |  |  |  |
| Compounded ML-4 at 212 F.[a] | 44.5 | 37.0 | 38.0 | 85.6 |
| Scorch at 280° F., min.[f] | 23.5 | 24.1 | 24.2 | 10.2 |
| Extrusion at 250° F.,[g]: |  |  |  |  |
| Inches/min | 56.5 | 63 | 63.5 | 72.5 |
| Grams/min | 86.5 | 93.5 | 90 | 91.6 |
| Rating (Garvey die) | 11+ | 11 | 10+ | 5 |
| Vulcanizate Properties, Cured 30 Minutes at 307° F.: |  |  |  |  |
| Vr [h] | 0.381 | 0.378 | 0.347 | 0.395 |
| 300% Modulus, p.s.i.[b] | 1,380 | 1,260 | 1,100 | 1,300 |
| Tensile, p.s.i.[b] | 2,270 | 1,670 | 1,325 | 1,820 |
| Elongation, percent [b] | 425 | 365 | 335 | 380 |
| ΔT, ° F.[c] | 55.9 | 56.5 | 64.0 | 60.7 |
| Resilience, percent [d] | 75.7 | 76.0 | 71.9 | 73.5 |
| Shore A hardness [e] | 56 | 54 | 54 | 66 |

[1] As in Example III.
[a] ASTM D-1646-61, Mooney Viscometer, large rotor, 4 minutes.
[b] ASTM D-412-61T, Scott tensile machine, L-6. Tests made at 80°F.
[c] ASTM D-623-52T. Method A, Goodrich Flexometer, 143 lb./sq. in. load, 0.175-inch stroke. Test specimen is a right circular cylinder 0.7 inch in diameter and 1 inch high.
[d] ASTM D-945-55 (modified). Yerzley oscillograph. Test specimen is a right circular cylinder 0.7 inch in diameter and 1 inch high.
[e] ASTM D-1706-61. Shore Durometer, Type A.
[f] ASTM D-1646-61. Mooney viscometer, large rotor. Scorch is time in minutes to 5-point rise above minimum Mooney.
[g] Ind. Eng. Chem. 34, 1309 (1942). A No. ½ Royle Extruder is used with a Garvey die. The rating is based on 12 for a perfectly formed product, with the lower numbers indicating less than perfect products.
[h] Rubber World 135, No. 1, 67-73 (1956). Volume fraction of polymer in swollen stock.

The data show that the 4,4'-oxybisbenzyl mercaptan-butyllithium complex was an effective initiator for the polymerization of butadiene. Certain beneficial effects were obtained through the use of the diallyldiphenyltin modifier. Processability was considerably better in the three samples in which the polymers were prepared in the presence of the diallyldiphenyltin modifier and was best in the two samples prepared with the 4,4'-oxybisbenzyl mercaptan-butyllithium complex initiator. While the overall properties of the first three polymers were very good, the first two had higher modulus, tensile strength and resilience, and lower heat build-up than the third. The complex initiator also gives polymers with a somewhat different structure from those obtained when butyllithium is used alone.

In the above examples, microstructure, inherent viscosity, and gel were determined for the polymer according to the folowing procedures:

Microstructures were determined with a commercial infrared spectrometer. For polyisoprene the samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. Trans is not detectable in the presence of a high cis polyisoprene, since trans is measured at the 8.75 micron band. The raw cis and raw 3,4-addition can be converted to normalized values by changing each value proportionally so that their sum equals 100 percent. For polybutadiene, similar polymer solutions were formed and the percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur adsorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications can be made in this invention without departing from the spirit or scope thereof.

I claim:
1. A polymerization initiator which is the reaction product of an alkyllithium having up to 12 carbon atoms per molecule and benzyl mercaptan derivatives of the formula

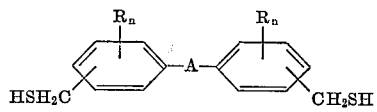

wherein A is a bivalent radical selected from the group consisting of —O—, —S—,

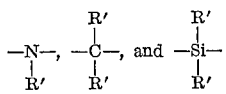

R and R' are hydrocarbon substituents selected from the group consisting of alkyl and cycloalkyl radicals with the total number of carbon atoms in the hydrocarbon substituents not exceeding 12 and $n$ is an integer from 0 to 4.

2. A polymerization initiator composition which is the reaction product of n-butyllithium and 4,4'-oxybisbenzylmercaptan.

3. A polymerization initiator which is the reaction product of an alkyllithium having up to 12 carbon atoms per molecule and benzyl mercaptan derivatives of the formula

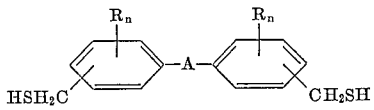

wherein A is a bivalent radical selected from the group consisting of —O—, —S—,

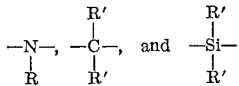

R and R' are hydrocarbon substituents selected from the group consisting of alkyl and cycloalkyl radicals with the total number of carbon atoms in the hydrocarbon substituents not exceeding 12, and $n$ is an integer of from 0 to 4, and a compound of the formula $SnR'_4$ wherein R' is selected from the group consisting of allylic-type radicals, an unsaturated organic radical in which the double bond is one carbon atom removed from the tin, and having 3 to 12 carbon atoms and aromatic radicals having 6 to 12 carbon atoms, at least one of the R' radicals being of the allylic type.

4. A polymerization initiator composition which is the reaction product n-butyllithium, 4,4'-oxybisbenzyl mercaptan, and diallyldiphenyltin.

5. A method of making a polymerization initiator which comprises contacting an alkyllithium having up to 12 carbon atoms per molecule with a benzyl mercaptan derivative having the formula

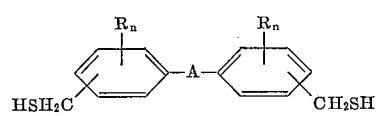

wherein A is a bivalent radical selected from the group consisting of —O—, —S—,

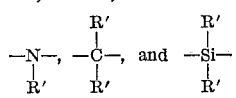

R and R' are hydrocarbon substituents selected from the group consisting of alkyl and cycloalkyl radicals with the total number of carbon atoms in the hydrocarbon substituent not exceeding 12, and $n$ is an integer from 0 to 4, in a hydrocarbon diluent.

6. The process of claim 5 wherein said alkyllithium is n-butyllithium and said benzyl mercaptan is 4,4'-oxybisbenzyl mercaptan.

7. A polymerization process which comprises contacting a vinylidene-containing monomer under polymerization conditions in a hydrocarbon diluent with an initiator sparingly soluble in said diluent, said initiator being a reaction product of an alkyllithium having up to 12 carbon atoms per molecule and benzyl mercaptan derivatives of the formula

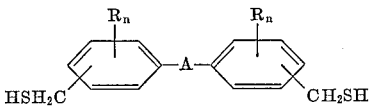

wherein A is a bivalent radical selected from the group consisting of —O—, —S—,

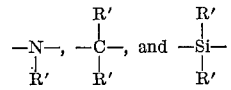

R and R' are hydrocarbon substituents selected from the group consisting of alkyl and cycloalkyl radicals with the total number of carbon atoms in the hydrocarbon substituents not exceeding 12, and $n$ is an integer from 0 to 4.

8. A process according to claim 7 wherein said initiator is modified by the addition thereto of an organotin compound of the formula $SnR'_4$ wherein R' is selected from the group consisting of allylic-type radicals, an unsaturated organic radical in which the double bond is one carbon atom removed from the tin, and having 3 to 12 carbon atoms and aromatic radicals having 6 to 12 carbon atoms, at least one of the R' radicals being of the allylic type.

9. The process of claim 7 wherein said vinylidene-containing monomer is isoprene.

10. The process of claim 7 wherein said vinylidene-containing monomer is butadiene.

11. The process of claim 7 wherein said initiator is the reaction product of n-butyllithium and 4,4'-oxybisbenzyl mercaptan.

12. A polymerization process which comprises contacting a conjugated diene having 4 to 12 carbon atoms per molecule under polymerization conditions with an initiator sparingly soluble in said diluent, said initiator being a reaction product of an alkyllithium having up to 12 carbon atoms per molecule and benzyl mercaptan derivatives of the formula

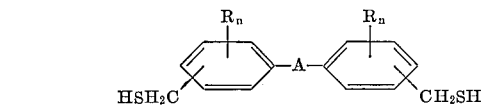

wherein A is a bivalent radical selected from the group consisting of —O—, —S—,

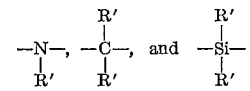

R and R' are hydrocarbon substituents selected from the group consisting of alkyl and cycloalkyl radicals with the total number of carbon atoms in the hydrocarbon substituents not exceeding 12, and $n$ is an integer from 0 to 4.

13. A process according to claim 12 wherein said initiator is modified by the addition thereto of an organotin compound of the formula $SnR'_4$ wherein R' is selected from the group consisting of allylic-type radicals, an unsaturated organic radical in which the double bond is one carbon atom removed from the tin, and having 3 to 12 carbon atoms and aromatic radicals having 6 to 12 carbon atoms, at least one of the R' radicals being of the allylic type.

References Cited

UNITED STATES PATENTS

| | | | |
|---|---|---|---|
| 3,085,120 | 4/1963 | Seyferth et al. | 260—94.2 |
| 3,215,679 | 11/1965 | Trepka | 260—94.2 |

JOSEPH L. SCHOEFER, *Primary Examiner.*

H. I. CANTOR, *Assistant Examiner.*